United States Patent [19]

McCullough et al.

[11] Patent Number: 4,696,840
[45] Date of Patent: Sep. 29, 1987

[54] BLOWN BAG-IN-BOX COMPOSITE CONTAINER AND METHOD AND APPARATUS FOR MAKING THE SAME

[75] Inventors: Michael J. McCullough, Ft. Thomas, Ky.; Gary E. McKihhen, Cincinnati; John E. Skidmore, Hamilton, both of Ohio

[73] Assignee: The Procter & Gamble Company, Cincinnati, Ohio

[21] Appl. No.: 808,587

[22] Filed: Dec. 13, 1985

[51] Int. Cl.⁴ .............................................. B65D 1/08
[52] U.S. Cl. ................................... 220/462; 222/105; 229/162; 383/80; 428/35
[58] Field of Search ............. 222/105, 183; 229/17 R, 229/7 R; 53/175; 425/503; 428/35

[56] References Cited

U.S. PATENT DOCUMENTS

| | | | |
|---|---|---|---|
| 2,959,812 | 11/1960 | Allen | 425/503 |
| 3,160,326 | 12/1964 | Sturdevant et al. | 222/183 |
| 3,184,117 | 5/1965 | Sanderson | 222/183 |
| 3,233,817 | 2/1966 | Casady | 229/14 |
| 3,353,738 | 11/1967 | Andreasson | 229/7 R |
| 3,427,646 | 2/1969 | Scholle | 229/17 R |
| 3,613,986 | 10/1971 | Christensson | 229/17 R |
| 4,141,466 | 2/1979 | Gordon et al. | 220/462 |
| 4,155,697 | 5/1979 | Gordon et al. | 425/535 |
| 4,225,053 | 9/1980 | Naugle et al. | 220/416 |
| 4,256,231 | 3/1981 | Cioc et al. | 215/1 |
| 4,342,183 | 8/1982 | Gordon et al. | 53/433 |
| 4,342,399 | 8/1982 | Stirling | 215/12 |
| 4,382,767 | 5/1983 | Naugle et al. | 425/504 |
| 4,386,923 | 6/1983 | Okushita | 493/87 |
| 4,416,395 | 11/1983 | Gaubert | 222/83 |
| 4,484,431 | 11/1984 | Okushita | 53/170 |
| 4,505,694 | 3/1985 | Okushita | 493/101 |
| 4,524,564 | 6/1985 | Groom et al. | 53/449 |
| 4,524,883 | 6/1985 | Herring | 220/462 |
| 4,572,422 | 2/1986 | Heuberger et al. | 229/7 R |

Primary Examiner—John E. Kittle
Assistant Examiner—James J. Seidleck
Attorney, Agent, or Firm—John J. Ryberg; E. Kelly Linman; John V. Gorman

[57] ABSTRACT

An improved bag-in-box (BIB) composite container wherein the container's inner bag is blow-molded inside the container's outer box. In one embodiment of the present invention, the body portion a heated and softened preform preferably made of polyethylene terephthalate (PET) is placed within a carton through an aperture in the carton's top end panel, followed to injecting expansion means such as a pressurized gas into the preform to expand it into a bag within the outer box. In another particularly preferred embodiment, a parison is extruded into an outer carton through an aperture in the carton's top end panel, followed by injecting expansion means such as a pressurized gas into the parison to expand it into a bag within the outer box. Also disclosed and described are means to enable a consumer to readily grasp the BIB container and to view the product contained therein, as well as apparatus that are useful in making BIB composite containers of the present invention.

9 Claims, 8 Drawing Figures

BLOWN BAG-IN-BOX COMPOSITE CONTAINER AND METHOD AND APPARATUS FOR MAKING THE SAME

TECHNICAL FIELD

The present invention pertains to bag-in-box (BIB) composite containers, and more particularly to BIB composite container wherein a thin-walled plastic bag is blow molded within an outer box. The present invention also pertains to a method and apparatus for making such a blow-molded BIB composite container.

BACKGROUND OF THE INVENTION

The food and beverage industry presently uses a wide variety of containers in packaging a vast assortment of materials and combination of materials, e.g., paperboard, glass, metals such as aluminum, and various plastics. Of course, there are advantages and disadvantages associated with each material. For example, paperboard is a relatively strong and inexpensive container material, but unfortunately is quite permeable to gases such as oxygen. Therefore, foods and beverages stored in paperboard containers tend to lose their freshness and degrade over a short period of time. In comparison, containers made from glass, metals, and some plastics are relatively impermeable to gases, but are rather expensive due to the high cost of those materials.

In recent years, the food and beverage industry has turned to bag-in-box (BIB) composite containers to package such products as bulk milk and wine. These BIB containers, which basically consist of a plastic inner bag within a sturdy outer paperboard box, combine the low cost strength of paperboard with the protection offered by various plastics. However, in automatically constructing, filling, and sealing most BIB containers, relatively complex and slow machinery and methods are typically used, which handicap the BIB material cost savings advantage. Furthermore, many prior art BIB container making apparatus and methods produce leaky and gas permeable containers.

One prior art bag-in-box and method of making the same is disclosed in U.S. Pat. Nos. 4,386,923; 4,484,431; and 4,484,431; which issued to Okushita and being incorporated herein by reference. Briefly, Ikushita's method beings by placing an unfilled bag, which comprises two substantially rectangular, superposed layers of flexible material sealed together along their distal edges, within an outer box. Next, the bag is inflated within the box, followed by placing the desired product into the bag through an attached fitment that projects outwardly from the box. Although the economics of such a method and apparatus are not known, it is known that a relatively high percentage of the inner bags made in this manner tend to leak due to the difficulty in consistently obtaining reliable heat seals along the bag's distal edges and between the bag/fitment interface.

Another prior art method of making a bag-in-box container is disclosed in U.S. Pat. Nos. 4,358,918 and 4,524,564, both issued to Grooms et al. and being incorporated herein by reference. Grooms' disclosed method begins by erecting an outer paperboard carton, followed by vacuum drawing a heat-sealed bag containing product within the erected outer carton. Unfortunately, as with Okushita's BIB container and method, Grooms' BIB method and apparatus produce a high percentage of leaky containers. In addition, since the disclosed BIB container is specifically intended for packaging discrete articles where reclosability is not critical, the container does not appear to be suitable for packaging a pourable liquid product that requires a pour spout, preferably one that is reclosable.

In providing a BIB composite container with a pouring spout, most prior art methods have relied on heat-sealing an annular flange of a pouring spout to the bag. Examples of this technique are shown in U.S. Pat. Nos. 3,363,807; 4,214,675; 4,322,018; and 4,355,737. However, as with heat-sealing the distal edges of a bag, it is rather difficult to consistently obtain reliable, non-leaking heat seals between the bag and spout.

Another problem associated with prior art BIB containers is obtaining a reliable interlock between the inner bag and the outer carton, which is particularly important in the case of a BIB having a pouring spout that is adapted to receive a screw cap or other closure means. Most prior art manufacturing methods require an additional step to achieve an interlock, such as gluing the bag to the inside of the box as disclosed in the Okushita references, or an added structural interlock device such as those disclosed in U.S. Pat. No. 4,524,883, which issued to Herring, and U.S. Pat. No. 4,174,051, which issued to Edwards et al. As expected, such additional steps or devices add significant costs in making BIB composite containers.

In light of the above, a principal object of the present invention is to provide a bag-in-box composite containers that is sturdy, relatively impermeable to gases, non-leaking, and inexpensive to make.

Another principal object of the present invention is to provide a BIB composite container wherein the inner bag and the inner bag/pouring spout interface have no heat seals or other discontinuities.

Another object of the present invention is to provide an inexpensive and reliable way of interlocking a BIB's pouring spout to the outer carton.

Another object of the present invention is to provide a convenient means for a consumer to grasp a BIB container for easier pouring of the product contained therein, as well as a means to view the product.

It is another object of the present invention to provide an economical manufacturing method of making bag-in-box composite containers.

Another object of the present inention is to provide efficient apparatus for making bag-in-box composite containers.

SUMMARY OF THE INVENTION

The present invention provides an improved bag-in-box composite container where a plastic bag is blow-molded within an outer box or carton. According to one embodiment of the present invention, an erected outer carton having an aperture in its top end panel is placed within restraining means such as a metal band cage or simple blow mold. Next, the heated and softened body portion of a preform, preferably made of polyethylene terephthalate (PET), is introduced within the erected carton through the aperture in the carton's top end panel. The preform's top portion, which provides a pouring spout that preferably has closure receiving means such as screw threads or snap-on lugs on its outer surface, remains outside the box. The hot preform is then injected with an expansion means such as a pressurized gas to expand the preform's body portion into a thin-walled bag within the box. Alternatively, if the product to be contained within the BIB is a fluid, the product itself can be used as the means to expand the preform within the outer box. After the blown inner bag has expanded and cooled, the finished bag-in-box composite container is removed from the restraining means, then filled with product through the pouring spout, followed by attaching closure means such as a screw-on or snap-or cap to the pouring spout.

In another particularly preferred embodiment of the present invention, the body portion of a heated thermoplastic parison having a closed tail end is extruded from an extrusion nozzle into an erected carton through an aperture in the carton's top end panel while the parison's top portion remains outside the carton. A split blow mold is then closed around the outer carton such that the mold's top section firmly grapsys the parison's top portion extending outside the carton. After the parison is severed from the extrusion nozzle, it is injected with expansion means such as a pressurized gas, which expands the parison's body portion into a thin-walled bag within the carton and the parison's top portion into a pouring spout. After the blown inner bag and outer pouring spout have cooled and solidified, the blow mold is opened and the finished BIB container removed. The BIB container is then filled with product through its pouring spout, followed by attaching closure means such as a screw-on or snap-on cap to the pouring spout.

In another preferred embodiment of the present invention, a heated thermoplastic parison is extruded from an extrusion nozzle into an erected carton having apertures in its top and bottom end panels. The parison is extruded such that its top portion remains outside the carton while its bottom portion extends outside the carton through the bottom end panel's aperture. A split blow mold is then closed around the carton such that the mold's top section firmly grasps the parison's top portion extending outside the carton, and a set of pinchers projecting from the mold's bottom section pinch the parison's bottom portion also extending outside the carton. After the parison is severed from the extrusion nozzle, it is injected with expansdion means such as a pressurized gas, which expands the parison's body portion into a thin-walled bag within the carton and the parison's top portion into a pouring spout. After the blown inner bag and outer pouring spout have cooled and solidified, the blow mold is opened and the finished BIB container removed. The BIB container is then filled with product through its pouring spout, followed by attaching closure means such as a screw-on or snap-on cap to the pouring spout.

The present invention also provides means for a consumer to conveniently grasp BIB containers of the present invention and for viewing the product container therein, as well as apparatus that are particularly well suited for practicing the above-discussed methods of making improved bag-in-box containers of the present invention.

BRIEF DESCRIPTION OF THE DRAWINGS

While the specification concludes with claims particularly pointing out and distinctly claiming the subject matter regarded as forming the present invention, it is believed that the invention will be better understood from the following description and drawings in which:

DETAILED DESCRIPTION OF THE INVENTION

In the following detailed description of the present invention, the same numeral is used to indicate common apparatus and workpiece components found in the various embodiments illustrated. In addition, the terms "carton" and "box" are used synonymously throughout. Finally, the frame, transport means, and preform or parison expansion means and the like which must necessarily be provided with respect to the functional members of the disclosed apparatus are not shown in the figures or described in detail in order to simplify and more clearly depict and disclose the present invention, it being understood that such details are well within the knowledge of those skilled in the arts of bag-in-box manufacturing and blow-molding.

Figure 1:
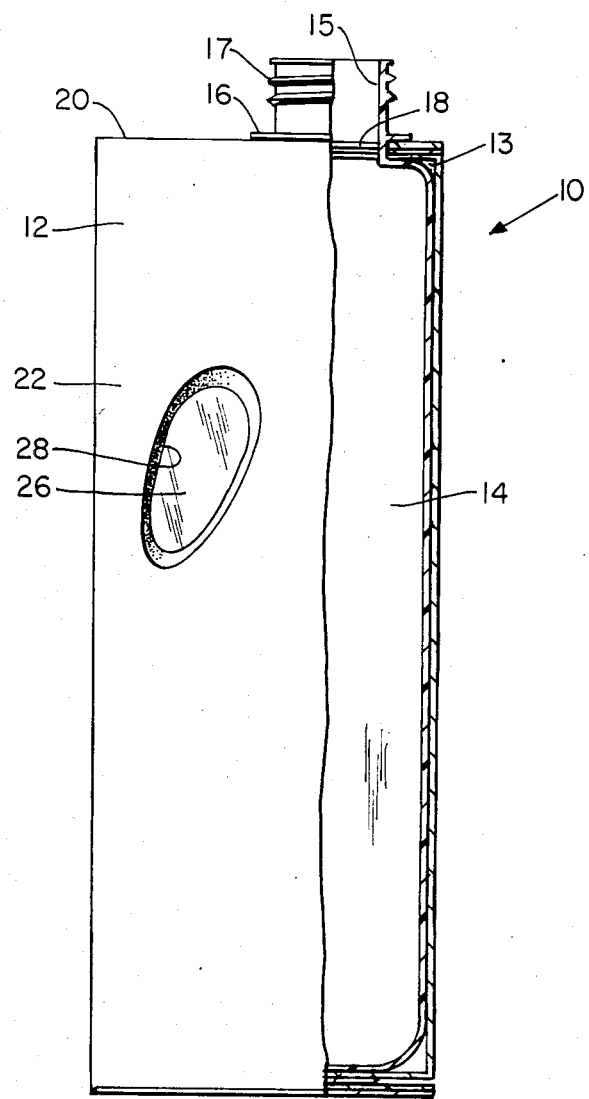
FIG. 1 is a side view of a bag-in-box composite container of the present invention with portions cut away to illustrate details.

FIG. 1 is a side view of a particularly preferred bag-in-box composite container 10 of the present invention with portions cut away. BIB container 10 comprises an outer carton 12 defining a hollow box cavity 13, and an inner plastic bag 14 blow-formed therein. Inner plastic bag 14 has an integral pouring spout 15 and integral annular flange 16 that extend outside carton 12 through aperture 18 located in the top end panel 20 of carton 12. Preferably, the outer surface of pouring spout 15 is provided with closure receiving means such as screw threads 17 as illustrated. In the particularly preferred embodiment shown in FIG. 1, aperture 18 and pouring spout 15 are located off-center to the longitudinal axis of BIB container 10 for easier pouring of the product contained therein.

In BIB container 10 shown in FIG. 1, side wall panel 22 of carton 12 has a substantially-transparent, concave plastic window 26 inserted within a cut-out portion 28 of side panel 22. Preferably, there are two plastic windows 26, the other being on the opposite side of carton 12 (not shown), each being attached to the opposing inner surfaces of side wall panel 22 by, for example, an adhesive. Windows 26 serve the dual purpose of providing a means to view the product contained within BIB 10, as well as a means for a consumer to conveniently grasp BIB 10 when dispensing the product contained therein. Preferably, windows 26 are made by thermoforming or injection molding such clear plastics as polyethylene terephthalate (PET), polyvinyl chloride (PVC), styrene, butryrate, or acetate, and are thick enough to prevent a consumer's fingernail or other sharp object from puncturing inner bag 14.

Figure 2:
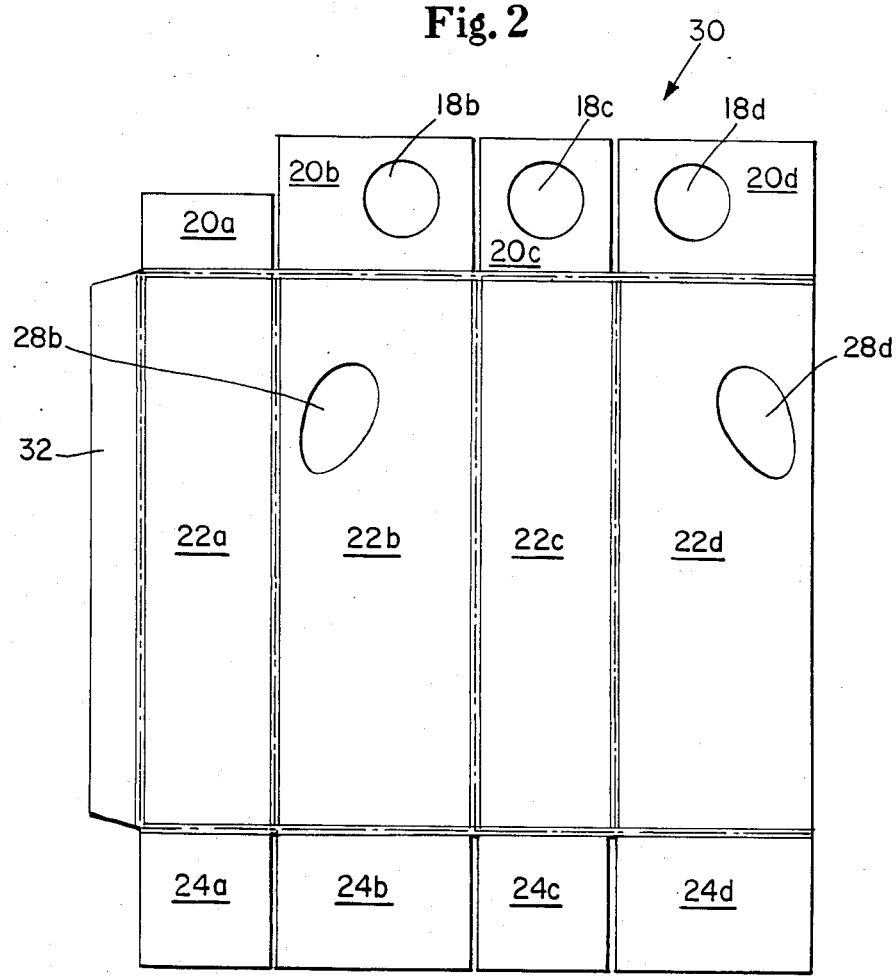
FIG. 2 illustrates a particularly preferred unitary blank that can be used in making BIB composite containers of the present invention.

As will be appreciatd by those skilled in the art of BIB composite container manufacturing, outer carton 12 can be made from a wide variety of materials as well as assume a wide variety of shapes. For example, carton 12 may be made of paperboard, corrugated board, or the like, and may have a rectangular, square, oval, or circular cross-section. An example of a particularly prferred unitary blank 30 from which outer carton 12 can be made is shown in FIG. 2. In FIG. 2, blank 30 comprises four side wall panels 22a, 22b, 22c, and 22d; four bottom end panels 24a, 24b, 24c, and 24d; four top end panels 20a, 20b, 20c, and 20d; and a side sealing flap 32. The dotted lines shown in FIG. 2 represent score lines or hinge lines along which blank 30 is folded in making rectangular outer carton 12. Top end panels 20b, 20c, and 20d have die-stamped apertures 18b, 18c, and 18d, respectively, which correspond to aperture 18 when blank 30 is erected and glued together to form outer carton 12. Side wall panels 22b and 22d have die-stamped apertures 28b and 28d, respectively, to accommodate the plastic windows 26 shown in FIG. 1. Preferably, plastic windows 26 are glued to the inner surfaces of side panels 22b and 22d before blank 30 is erected and sealed to form outer carton 12.

Figure 3:
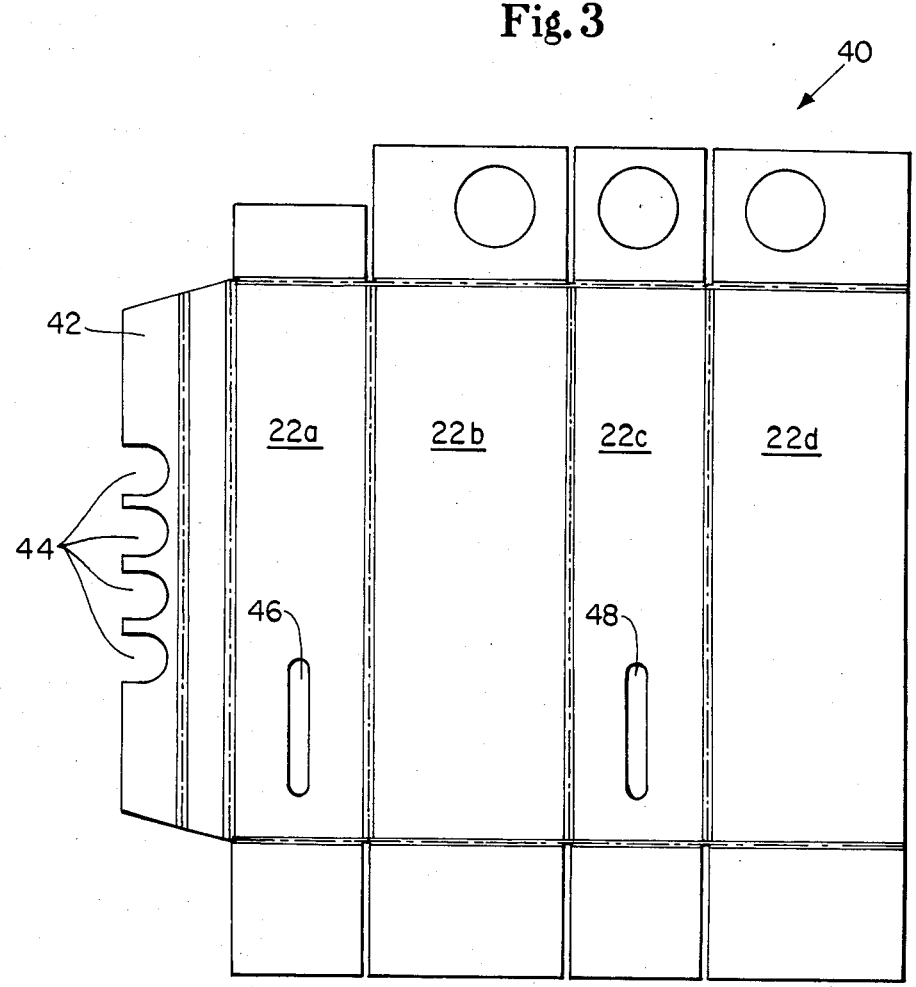
FIG. 3 illustrates another particularly preferred unitary blank that can be used in making BIB composite containers of the present invention.

Another particularly preferred embodiment of a unitary blank from which outer carton 12 can be constructed is shown in FIG. 3. In FIG. 3, blank 40 has two features that can be substituted for the function provided by plastic windows 26 in the embodiment shown in FIGS. 1 and 2. In FIG. 3, extended side sealing flap 42 has a series of finger notches 44 cut therein which, when flap 42 is folded and glued to the outer surface of side wall panel 22d, provide an alternate means for a consumer to conveniently grasp BIB 10. Extended flap 42 also provides additional strength to BIB 10 since it is folded to a double thickness before being glued to side wall panel 22d. To provide a means for a consumer to view how much product remains within BIB 10, blank 40 is provided with two elongated cut-outs 46 and 48 die-stamped in sidewall panels 22a and 22c, respectively. Cut-outs 46 and 48 also provide a convenient means to vent carton 12 when the inner bag is blown therein as will be explained hereinafter.

Preferably, the outer surface of blanks 30 and 40 are printed with graphics, instructions, directions, etc. before they are coated with a moisture or oil resistant material such as polyethylene. In addition, the inner surface of blanks 30 and 40 can be coated with a low friction material such as polyethylene, which aids in the bag blowing/expansion process described hereinafter.

Figure 4:
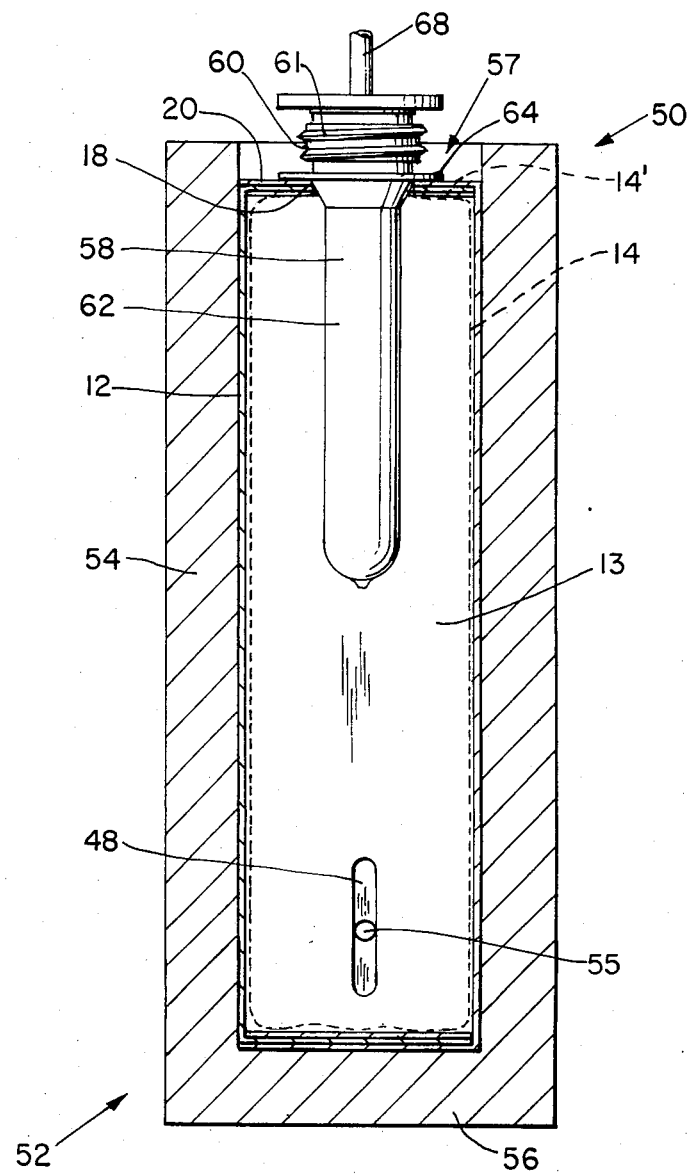
FIG. 4 is a cross-sectional schematic view of a particularly preferred apparatus that can be used in making bag-in-box composite containers of the present invention.

Turning now to FIG. 4, one particularly preferred BIB forming apparatus according to the present invention is schematically illustrated and generally indicated by the reference numeral 50. In FIG. 4, apparatus 50 comprises a blow mold 52 having continuous sidewall 54 and bottom wall 56, thereby defining hollow mold cavity 57. Preferably, sidewall 54 has an air vent 55 therein that is lined up with cut-out 48 in carton 12. Of particular significance is that blow mold 52 need not have a polished inner surface, or be made to exact specifications. As will be explained hereinafter, this is because the inner surface of carton 12 is in essence the inner surface of the blow mold while blow mold 52 merely provides some type of restraining support for the blowing operation. Indeed, since relatively low pressure gas is used in forming inner plastic bag 14 as will also be hereinafter explained, blow mold 52 may comprise a simple metal-banded cage that defines a cavity approximately the same size as or slightly larger than the erected outer carton.

In making a BIB of the present invention with the particularly preferred apparatus 50 illustrated in FIG. 4, an erected carton 12 is placed within hollow blow-mold cavity 57 by using, for example, pneumatic grippers, mechanical grippers, or a gravity feed chute (not shown). Next, the top portion 60 of preform 58, which preferably has threads 61 on its outer surface, is sealingly engaged to blow pin 68. Preform 58 is preferably made of injection-molded polyethylene terephthalate because of its good oxygen barrier and burst strength characteristics. Of course, other thermoplastics or polymers such as polyvinyl chloride (PVC), surlyn, styrene, acrylonitrile copolymers, or ethylene vinylalcohol copolymer (EVOH) can be used, the particular material selected of course depending on the nature of the product to be contained with the BIB container. Alternatively, in some instances it might be desirable to use a coinjection-molded preform comprised of various layers of plastic resin. Examples of such coinjection-molded preforms and methods of and apparatus for making the same are disclosed in U.S. Pat. No. 4,550,004, which is hereby incorporated herein by reference.

Once top portion 60 of preform 58 is properly seated on the end of blow pin 68, preform body portion 62 is heated above its softening temperature by means (not shown) of quartz lamps, a radio frequency oven, a conventional oven, dipping in hot liquid, or other preform heating means well known to those skilled in the reheat/blow-mold art. Preferably, preform top portion 60 is shielded from such heating means and kept below the material's softening temperature. Once preform body portion 62 is heated and softened, blow pin 68 with attached preform 58 is moved directly above aperture 18 located in top end panel 20 of outer carton 12. Next, blow pin 68 is lowered into the position illustrated until preform flange 64 comes into firm contact with carton top panel 20. In so doing, preform body portion 62 is placed within hollow box cavity 13 of erected carton 12, while preform top portion 60 and flange 64 remain outside carton 12. Once preform 58 is in place, expansion means such as pressurized gas (not shown), which is preferably chilled to reduce cooling time, is injected into preform 58 through blow pin 68. The pressurized gas expands preform body portion 62 within hollow box cavity 13 of outer carton 12 to form inner bag 14 as indicated by dashed lines. Alternatively, if the product to be contained with the BIB container is a fluid, the product itself can be used to expand the body portion 62 of preform 58, which would eliminate the step of filling the BIB container at a later time.

In expanding the body portion 62 of preform 58 as described above, top end panel 20 is firmly sandwiched between preform flange 64 and top surface 14' of inner bag 14, thereby providing an interlock between bag 14 and carton 12. Such an interlock substantially prevents pouring spout 15 (preform top portion 60) from rotating when a screw cap (not shown) or other closure means is releasably engaged thereon. In addition, if carton 12 and bag 14 are non-round, e.g. rectangular as shown, their shape also helps in providing an interlock between the two. However, if carton 12 and bag 14 have a shape such that bag 14 can rotate within carton 12, e.g., cylindrical, other interlock means might be necessary. For example, aperture 18 in carton end panel 20 and the area of preform 58 just below flange 64 might have an oval, square, or other complementary non-round shape. Alternatively or in addition, an adhesive can be applied to the inside surface of carton 12 or to the outer surface of preform body portion 62 before preform 58 is inserted and blow-formed within hollow boxy cavity 13 as described above.

As mentioned earlier herein, carton 12 preferably has cut-outs 46 and 48 (48 shown in FIG. 4) in its side wall to provide a means for air within hollow box cavity 13 to escape when preform body portion 62 is expanded therein. As also mentioned earlier, the inner surface of carton 12 can be coated with a low friction material which helps expanding preform body portion 62 slide down the carton's inner surface while it expands, although it has been found that such as inner coating is not critical.

Of course, other types of restraining means other than blow mold 52 can be utilized in making BIB 10. For example, a split mold having 2 moveable halves having top, bottom, and side walls could be used. In such a case, the mold's top wall would have an aperture large enough to accommodate the insertion of preform 58 therethrough. Such a blow mold would be similar to that illustrated in U.S. Pat. No. 4,342,399, which is hereby incorporated herein by reference.

By practicing the above-described method, it is particularly significant that inner bag 14 and pouring spout 15 (preform top portion 60) are an integrally-formed unit that has no heat seals or other discontinuities where leakage can occur as exhibited by prior art BIB containers. In addition, since outer carton 12 provides the structural integrity for the BIB, it is particularly significant that body portion 62 of preform 58 can be relatively thin, which in the case of a relatively expensive material such as PET, offers significant cost savings when compared to the thick-walled PET bottles now commonly used in the packaging industry. Furthermore, since body portion 62 of preform 58 is rather thin and does not have to be blown to a precise volume or have a perfect surface detail, only a relatively low pressure expansion means is required to expand the preform, which is turn makes it possible to use a simple and inexpensive restrainng means such as that illustrated. In addition, since preform body portion 62 comprises very little plastic material, a corresponding small amount of heat must be dissipated in order to cool and solidify blown bag 14, which is turn eliminates the need for expensive, chilled blow molds typically used in PET bottle blow molding. Finally, since such simple and inexpensive blow-molds can be used, it is relatively easy and inexpensive to change molds to produce different sized and shaped BIB containers with the same base apparatus.

As an example of making a BIB composite container as described above, an erected paperboard carton made of 28-point (0.028 inch thick) solid bleached sulfite carton board was placed within a simple, open-topped, blow mold. The carton was rectangular and had dimensions of approximately 9¼" height×3⅜" width×2⅝" deep as measured from the outside. The body portion of a cylindrical PET preform approximately 4¾" long having a body portion with approximately a 0.73" O.D., 0.55" I.D., and 0.09" average wall thickness was heated to approximately 275° F. After the heated preform body was inserted in the outer carton through a 1⅛" diameter aperture in the carton's top end panel, the preform was expanded by injecting air into the preform at 35 psi for 1.5 seconds, immediately followed by a 70 psi gas injection for 15 seconds to allow for proper expansion and cooling.

Figure 5:
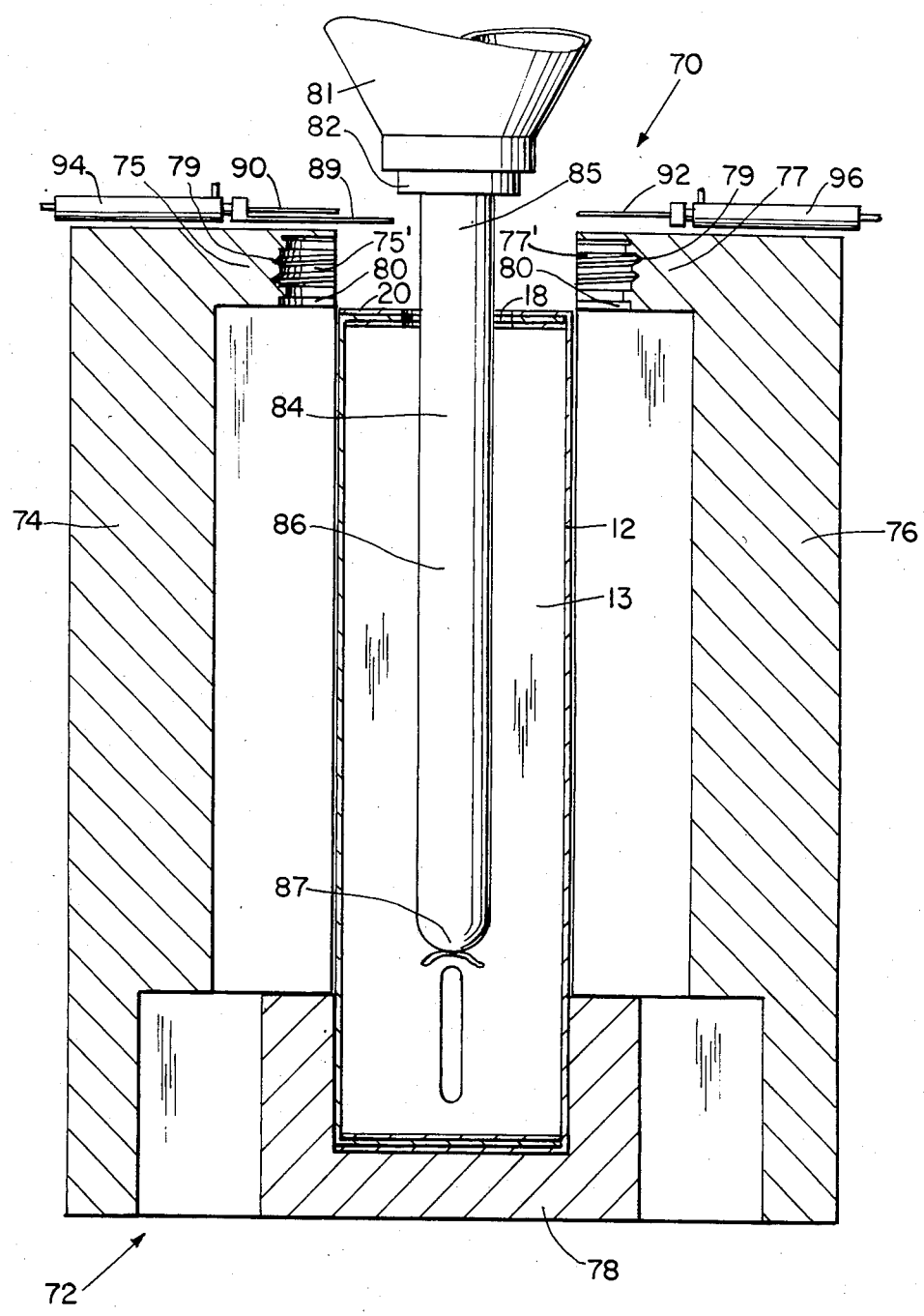
FIG. 5 is a cross-sectional schematic view of a component of another particularly preferred apparatus that can be used in making a bag-in-box composite container of the present invention.
Figure 6:
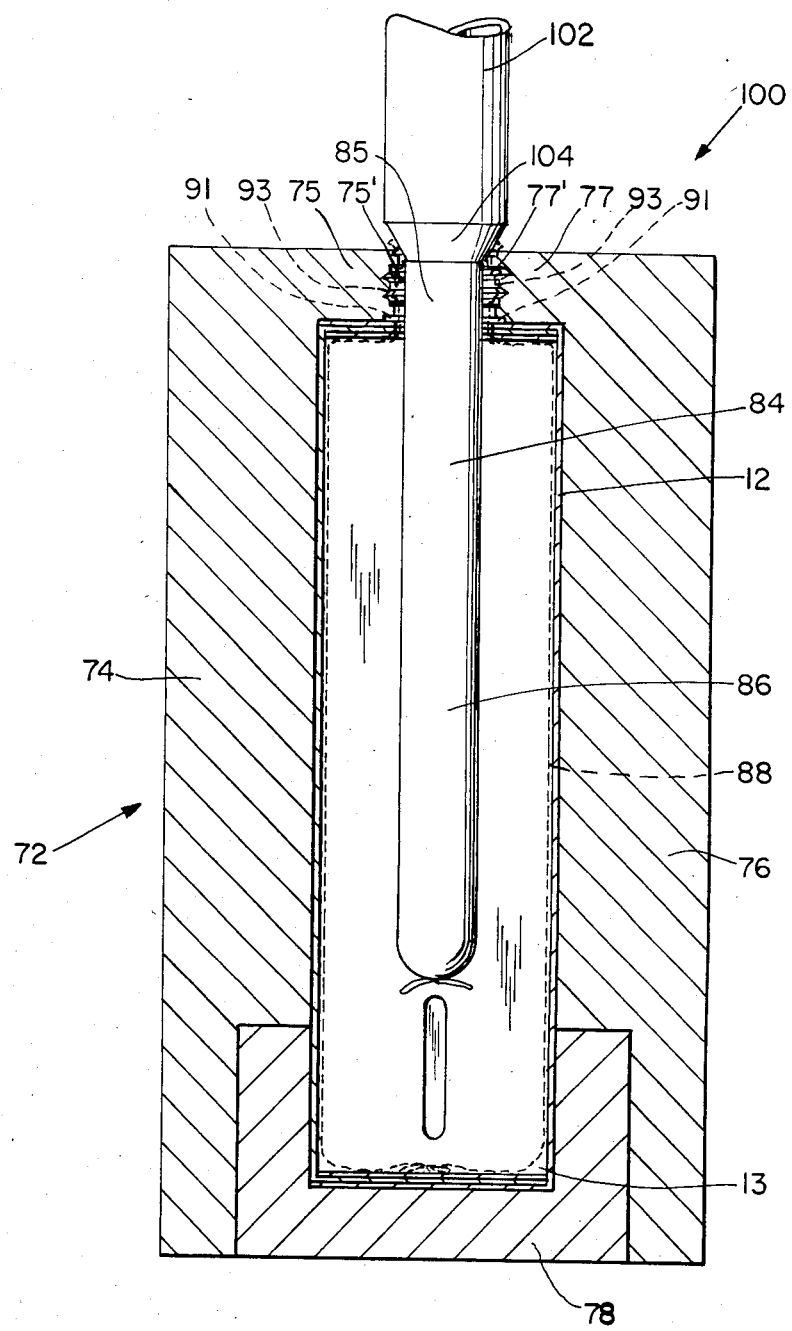
FIG. 6 is a cross-sectional schematic view of another component of the preferred apparatus referred to in FIG. 5.

FIGS. 5 and 6 are cross-sectional schematic views of a preferred apparatus for making another particularly preferred embodiment of a bag-in-box composite container of the present invention, in this case a BIB having an inner plastic bag blow-formed from an extruded hollow parison. In FIG. 5, the apparatus component generally indicated as 70 comprises a blow-mold generally indicated as 72 having moveable blow-mold halves 74 and 76, and moveable cup-shaped bottom section 78. Blow-mold halves 74 and 76 have top sections 75 and 77, respectively, the outer surfaces 75' and 77' of which preferably having closure receiving-forming means such as screw threads 79, and flange-forming means 80 machined thereon. Apparatus 70 also includes hopper 81 that is in fluid communication with extrusion nozzle 82. Hopper 81 contains a mass of molten thermoplastic material such as low density polyethylene (LDPE), High density polyethylene (HDPE), polyvinyl chloride (PVC), polycarbonate (PC), Barex ® (a high barrier material available from Standard Oil of Ohio), glycol-modified PET (available from Eastman Plastics), nylon, styrene acrylonitrile copolymers, or ethylene vinylalcohol copolymers (EVOH), Of course, other extrudable thermoplastics and synthetic resins can also be used depending on the nature of the product to be contained within the BIB.

In operation, an erected outer carton 12 having an aperture 18 in its top end panel 20 is placed on moveable bottom section 78 of blow mold 72 by using, for example, a pneumatic or mechanical gripper, or a gravity-feed slide chute (not shown). Moveable mold bottom section 78 and carton 12 are then moved below extrusion nozzle 82 as illustrated in FIG. 5 such that aperture 18 in carton top end panel 20 is aligned directly below nozzle 82. When carton 12 is properly in place, extrusion nozzle 82 begins extruding hollow parison 84 having a closed tail end portion 87 into carton 12 through aperture 18 in carton top end panel 20. When a predetermined length of parison 84 has been extruded, blow mold halves 74 and 76 are closed around carton 12 such that the top sections 75 and 77 of mold halves 74 and 76, respectively, grasp top portion 85 of parison 84 remaining outside carton 12. Mold halves 74 and 76 can be closed in this manner by using penumatic or hydraulic cylinders, or mechanical linkages, all of which being commonly used in the blow-molding industry.

After mold halves 74 and 76 are closed around carton 12, heated knife 89 is thrust laterally through top portion 85 of parison 84, thereby cleanly severing it from extrusion nozzle 82. Simultaneously, pinchers 90 and 92 are thrust laterally into the tail end or bottom section of the next parison to be extruded from nozzle 82 to close the parison shut. Such lateral movement of knife 89 and pinchers 90 and 92 can be done by using, for example, a pair of pneumatic actuators 94 and 96.

After parison 84 has been cleanly severed from extrusion nozzle 82, closed blow mold 72 containing carton 12 and grasped parison 84 is moved to blow station generally indicated as 100 and illustrated in FIG. 6. In FIG. 6, closed blow mold 72 has been moved directly below blow pin 102 such that tapered tip 104 of blow pin 102, when lowered as shown, sealingly engages top portion 85 of parison 84 and top sections 75 and 77 of blow mold 72. Once tip 104 of blow pin 102 is properly seated, expansion means such as pressurized gas (not shown) in fluid communication with blow pin 102 is injected into parison 84. The injected gas expands body portion 86 of parison 84 within hollow box cavity 13, thereby forming inner plastic bag 88 as indicated by dashed lines. The injected gas also expands top portion 85 of parison 84 against surfaces 75' and 77' of mold top portions 75 and 77 and flange-forming slot 80, thereby forming flange 91 and pouring spout 93 (also indicated by dashed lines) having screw threads or other closure receiving means on its outer surface. The pressurized gas is held for a sufficient amount of time to allow inner plastic bag 88 along with integral pouring spout 93 and flange 91 to cool and solidify. After bag 88, spout 93, and flange 91 have cooled, mold halves 74 and 76 are opened, BIB 10 removed, and halves 74 and 76 returned to the position shown in FIG. 5 to repeat the above-described cycle.

Figure 7:
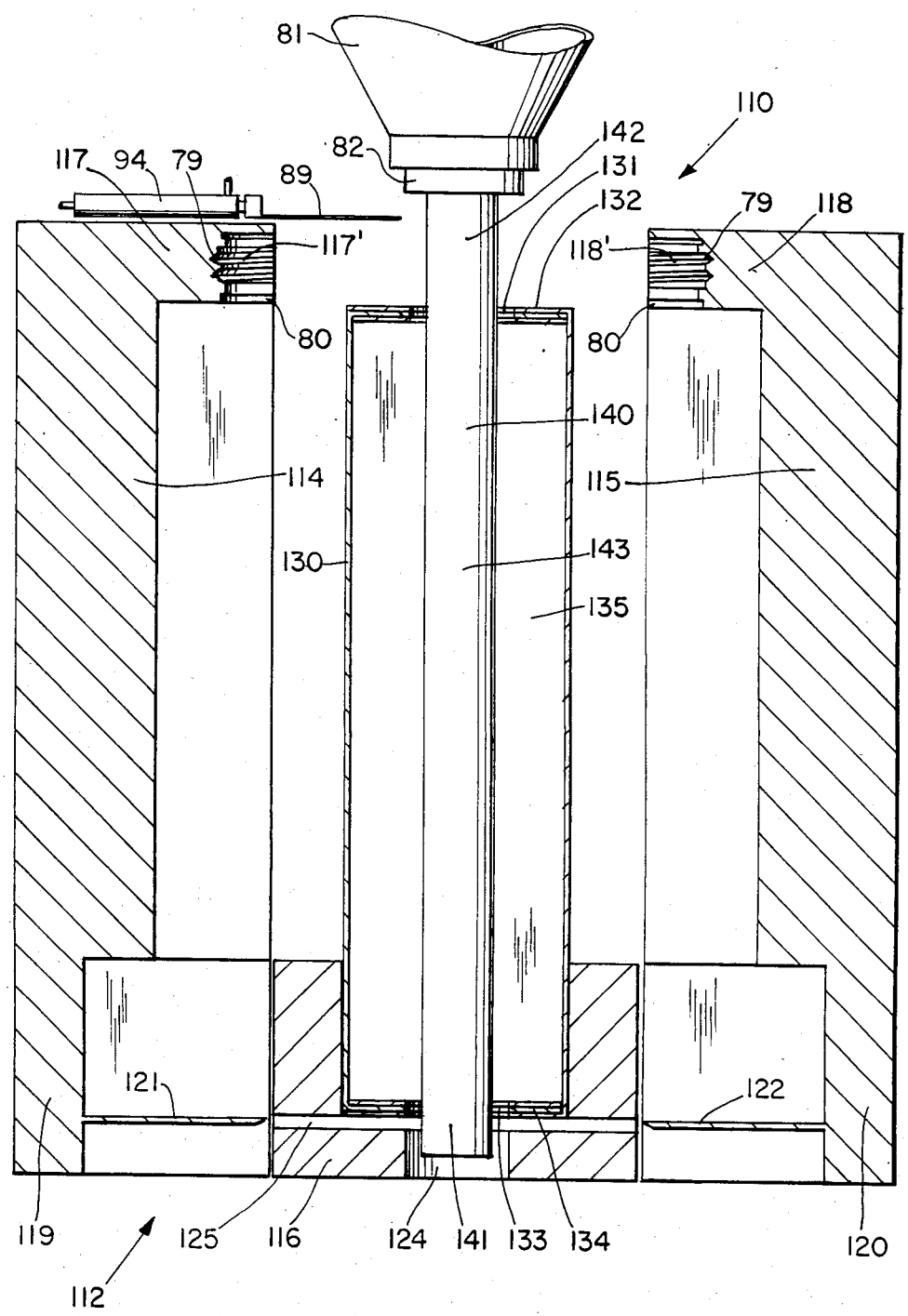
FIG. 7 is a cross-sectional schematic view of a component of yet another preferred apparatus that can be used in making a bag-in-box composite container of the present invention.
Figure 8:
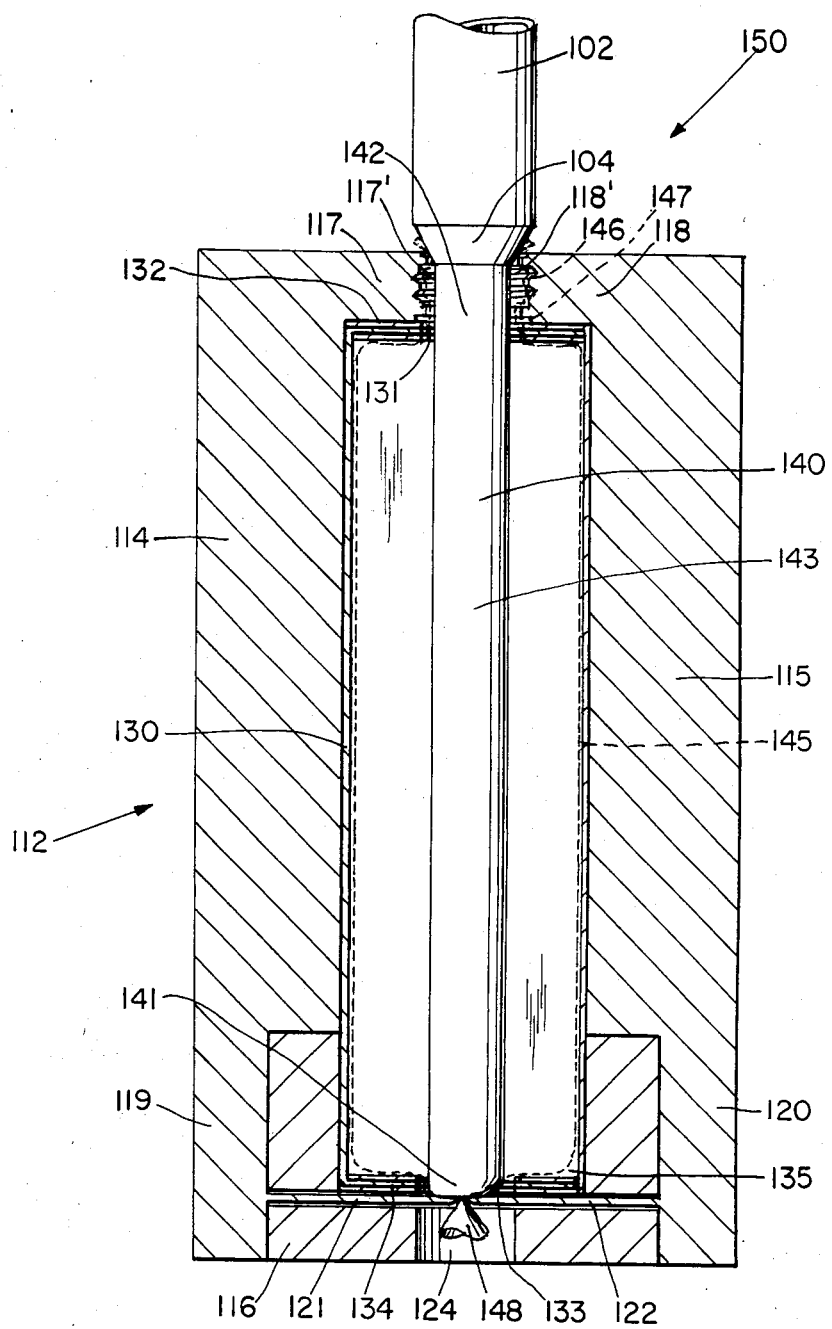
FIG. 8 is a cross-sectional schematic view of another component of the preferred apparatus referred to in FIG. 7.

FIGS. 7 and 8 are cross-sectional schematic views of a prefered apparatus for making another embodiment of a bag-in-box composite container of the present invention. In FIG. 5, the apparatus component generally indicated as 110 comprises blow-mold generally indicated as 112 having moveable halves 114 and 115, and moveable cup-shaped bottom section 116. Moveable mold haves 114 and 114 have top sections 117 and 118, respectively, the outer surfaces 117' and 118' of which preferably having closure receiving-forming means such as screw threads 79, and flange-forming means 80 machined thereon. Moveable mold halves 114 and 115 also have bottom sections 119 and 120, respectively, having pincher means 121 and 122 projecting therefrom. Moveable bottom section 116 has a vertical aperture 124 therethrough as well as a horizontal slot 125 appropriately sized to receive pincher means 121 and 122 when blow mold 112 is closed as described hereinafter. Apparatus 110 also includes extrusion nozzle 82 that is in fluid communication with hopper 81 containing a mass of molten thermoplastic material.

In operation, an erected outer carton 130 having an aperture 131 in its top end panel 132 and an aperture 133 in its bottom end panel 134 is placed on moveable mold bottom section 116 by using, for example, a pneumatic or mechanical gripper, or a gravity-feed slide chute (not shown). Moveable mold bottom section 116 and carton 130 are then moved below extrusion nozzle 82 as illustrated in FIG. 7 such that aperture 131 in carton top end panel 132 and aperture 133 in carton bottom end panel 134 are aligned directly below nozzle 82. When carton 130 is properly in place, extrusion nozzle 82 begins extruding hollow parison 140 into carton 130 through aperture 131 in carton top end panel 132. When the bottom portion 141 of parison 140 passes through aperture 133 in bottom end panel 134 and into vertical aperture 124 in moveable bottom mold section 116, blow mold halves 114 and 115 are closed around carton 130 and parison 140 by using, for example, pensumatic or hydraulic cylinders, or a mechanical linkage as commonly used in the blow-molding industry.

When blow-mold 112 is closed as shown in FIG. 8, top sections 117 and 118 of mold halves 114 and 115, respectively, firmly grasp top portion 142 of parison 140 remaining outside carton 130, while pincher means 121 and 122 projecting from bottom sections 119 and 120 of mold halves 114 and 115, respectively, enter horizontal slot 125 to pinch and firmly grasp bottom portion 141 of parison 140 extending outside carton 130. Immediately thereafter, heated knife 89 is thrust laterally through top portion 142 of parison 140, thereby cleanly severing it from extrusion nozzle 82.

After parison 140 has been cleanly severed from extrusion nozzle 82, closed blow mold 112 containing carton 130 and grasped parison 140 is moved to a blow station generally indicated as 150 and illustrated in FIG. 8. In FIG. 8, closed blow mold 112 has been moved directly below blow pin 102 such that tapered tip 104 of blow pin 102, when lowered as shown, sealingly engages top portion 142 of parison 140 and top sections 117 and 118 of blow mold 112. Once tip 104 of blow pin 102 is properly seated, expansion means such as pressurized gas (not shown) in fluid communication with blow pin 102 is injected into hollow parison 140. The injected gas expands body portion 143 of parison 140 within hollow box cavity 135, thereby forming inner plastic bag 145 as indicated by dashed lines. The injected gas also expands top portion 142 of parison 140 against the outer surfaces 117' and 118' of closed top sections 117 and 118, thereby forming pouring spout 146 and flange 147 extending outside carton 130. The pressurized gas is held for a sufficient amount of time to allow inner plastic bag 145 along with integral pouring spout 146 and flange 147 to cool and solidify. After bag 145, pouring spout 146, and flange 147 have cooled, mold halves 114 and 115 are opened and the finished BIB composite container removed. Flash piece 148 is then conventionally removed from the container before it is sent on for filling and capping.

As will be apparent to those skilled in the art, a BIB composite container having a laminated inner bag can be made with either apparatus component 70 or 110 shown in FIGS. 5 and 7 by co-extruding various plastics from a coextrusion nozzle. In such a case, the parison would typically comprise an outer layer of an inexpensive material sucy as polyethylene and a thin inner layer of a high barrier material, which is typically much more expensive. Such laminated BIB containers are particularly well suited in packaging delicate products such as orange juice and other citrus beverages.

Apparatus for and methods of making a novel and economical BIB composite container are thus provided. The apparatus shown have been somewhat simplified so that a person skilled in the art may readily understand the preceding description and economically incorporate the present invention into a high-speed manufacturing method by making a number of minor modifications and additions, none of which entail a depature from the spirit and scope of the present invention. Accordingly, the following claims are intended to embrace such modifications.

What is claimed is:
1. A bag-in-box composite container comprising:
 (a) a one-piece outer box constructed from a rigid material and having a continuous side wall and at least one end panel joined thereto thereby defining a hollow box cavity, said at least one end panel having an aperture therein; and
 (b) a one-piece inner bag located within said hollow box cavity of said outer box, said inner bag being blow-molded from a preformed tube and having an integrally formed ouring spout connected thereto, said pouring spout extending through said aperture in said end panel and having an outer surface, wherein said inner bag and said pouring spout are an integrally-formed unit having no heat seals or other discontinuities at their attachment interface.

2. The bag-in-box composite container recited in claim 1 wherein said one-piece inner bag is made from a material selected from the group consisting of polyethylene terephthalate, polyethylene, polypropylene, polyvinyl chloride, styrene, acrylonitrile copolymers, ethylene vinylalcohol copolymers, or laminated layers thereof.

3. The bag-in-box composite container recited in claim 1 wherein said outer box is constructed from a paperboard unitary blank having top end panels, bottom end panels, and side panels continuously joined together by hinge lines.

4. The bag-in-box composite container recited in claim 1 wherein said continuous side wall of said outer box has a double-thickness seam having at least one finger-shaped notch cut therein.

5. The bag-in-box composite container recited in claim 1 wherein said continuous side wall of said outer box has at least one aperture therein, said at least one aperture having a substantially transparent window affixed therein.

6. The bag-in-box composite container recited in claim 1 wherein said outer surface of said pouring spout has closure receiving means projecting therefrom.

7. The bag-in-box composite container recited in claim 6 wherein said closure receiving means comprises screw threads.

8. The bag-in-box composite container recited in claim 6 further comprising:
   (d) closure means releasably attached to said closure receiving means projecting from said outer surface of said pouring spout.

9. The bag-in-box composite container recited in claim 8 wherein said closure means comprises a screw cap.

* * * * *

UNITED STATES PATENT AND TRADEMARK OFFICE
CERTIFICATE OF CORRECTION

PATENT NO. : 4,696,840

DATED : Sep. 29, 1987

INVENTOR(S) : Michael J. McCullough et al.

It is certified that error appears in the above-identified patent and that said Letters Patent is hereby corrected as shown below:

Title page, Inventors:, delete "Gary E. McKihhen" and insert therefor -- Gary E. McKibben --.

Column 1, line 8, after "to" insert -- a --.

Column 1, line 16, after "assortment of" insert -- products. Such containers are made from many different --.

Column 1, line 45, delete "Ikushita's" and insert therefor -- Okushita's --.

Column 2, lines 29-30, delete "containers" and insert therefor -- container --.

Column 2, line 46, delete "inention" and insert therefor -- invention --.

Column 2, line 52, delete "where" and insert therefor -- wherein --.

Column 3, line 15, delete "grapsys" and insert therefor -- grasps --.

Column 3, line 42, delete "expansdion" and insert therefor -- expansion --.

UNITED STATES PATENT AND TRADEMARK OFFICE
CERTIFICATE OF CORRECTION

PATENT NO. : 4,696,840

DATED : Sep. 29, 1987

INVENTOR(S) : Michael J. McCullough et al.

Page 2 of 4

It is certified that error appears in the above-identified patent and that said Letters Patent is hereby corrected as shown below:

Column 3, line 42, after "expansion" should read --means such as a--.

Column 3, line 43, after "body" should read --por- --.

Column 3, line 44, after "bag" should read --within the carton and the--.

Column 3, line 45, before "top" should read --parison's--.

Column 3, line 45, after "After" should read --the--.

Column 3, line 46, after "have" should read --cooled--.

Column 3, line 54, delete "container" and insert therefor -- contained --.

Column 5, line 6, delete "appreciatd" and insert therefor -- appreciated --.

Column 6, line 42, after "18" should read --located--.

Column 6, line 44, before "flange" should read --preform--.

Column 6, line 45, before "panel" should read --top--.

Column 7, line 10, delete "boxy" and insert therefor -- box --.

Column 7, line 20, delete "as" and insert therefor -- an --.

Column 7, line 47, delete "is" and insert therefor -- in --.

Column 7, line 48, delete "restrainng" and insert therefor -- restraining --.

UNITED STATES PATENT AND TRADEMARK OFFICE
CERTIFICATE OF CORRECTION

PATENT NO. : 4,696,840

DATED : Sep. 29, 1987

INVENTOR(S) : Michael J. Cullough et al.

It is certified that error appears in the above-identified patent and that said Letters Patent is hereby corrected as shown below:

Column 7, line 52, delete "is" and insert therefor -- in --.

Column 8, line 25, delete "High" and insert therefor -- high --.

Column 8, line 51, delete "penumatic" and insert therefor -- pneumatic --.

Column 9, line 23, delete "prefered" and insert therefor -- preferred --.

Column 9, line 29, delete "haves" and insert therefor -- halves --.

Column 9, line 29, delete "114", second occurrence, and insert therefor -- 115 --.

Column 9, line 60, delete "pensumatic" and insert therefor -- pneumatic --.

Column 10, line 39, delete "sucy" and insert therefor -- such --.

UNITED STATES PATENT AND TRADEMARK OFFICE
CERTIFICATE OF CORRECTION

PATENT NO. : 4,696,840

DATED : Sep. 29, 1987

INVENTOR(S) : Michael J. Cullough et al.

It is certified that error appears in the above-identified patent and that said Letters Patent is hereby corrected as shown below:

Column 10, line 51, delete "depature" and insert therefor -- departure --.

Column 10, line 65, delete "ouring" and insert therefor -- pouring --.

Signed and Sealed this

First Day of March, 1988

Attest:

DONALD J. QUIGG

Attesting Officer

Commissioner of Patents and Trademarks